United States Patent
Land et al.

(10) Patent No.: US 7,692,638 B2
(45) Date of Patent: Apr. 6, 2010

(54) ERROR COMPENSATION FOR MULTI-TOUCH SURFACES

(75) Inventors: Brian Richards Land, Redwood City, CA (US); Steve Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 748 days.

(21) Appl. No.: 11/650,204

(22) Filed: Jan. 3, 2007

(65) Prior Publication Data

US 2008/0158184 A1 Jul. 3, 2008

(51) Int. Cl.
*G09G 5/00* (2006.01)
(52) U.S. Cl. ............... 345/173; 345/174; 345/178; 178/18.01; 341/120
(58) Field of Classification Search ............. 345/156, 345/173–179; 178/18.01–18.09; 341/120; 375/319, 324
See application file for complete search history.

(56) References Cited

U.S. PATENT DOCUMENTS

| 5,488,204 A | 1/1996 | Mead et al. |
| 5,880,411 A | 3/1999 | Gillespie et al. |
| 6,188,391 B1 | 2/2001 | Seely et al. |
| 6,323,846 B1 | 11/2001 | Westerman et al. |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2008/0062139 A1* | 3/2008 | Hotelling et al. ............ 345/173 |
| 2008/0158172 A1 | 7/2008 | Hotelling et al. |

* cited by examiner

*Primary Examiner*—Richard Hjerpe
*Assistant Examiner*—Jennifer T Nguyen
(74) *Attorney, Agent, or Firm*—Morrison & Foerster LLP

(57) ABSTRACT

Normalization of the built-in DC offset error in each analog channel is disclosed to reduce image distortion in multi-event (multi-touch or multi-hover) sensor panels. By eliminating the component-dependent offset error from each analog channel, each analog channel will generate approximately the same output value for a given dynamic input signal. Normalization can include "phantom row" compensation, which involves measuring the static output value of each analog channel when no stimulus is applied to any row of a multi-event sensor panel, and subtracting this value out of any subsequent output value generated by the analog channel. Normalization can also include DAC offset compensation, which involves setting the offset compensation voltage of each analog channel to some fraction of its normal value, measuring the output of the analog channel over temperature, determining a temperature coefficient, and adjusting any subsequent output value generated by the analog channel to account for this drift.

27 Claims, 8 Drawing Sheets

ERROR COMPENSATION FOR MULTI-TOUCH SURFACES

FIELD OF THE INVENTION

This relates to panels used as input devices for computing systems, and more particularly, to normalizing the outputs of the analog channels that generate values representative of the sensor panels by determining the offset error inherent in the electronics of the analog channels and compensating for the errors in the analog channel outputs.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers or other objects upon a touch-sensitive surface). Future touch panels can detect multiple touches (the touching of fingers or other objects upon a touch-sensitive surface at distinct locations at about the same time) and near touches (fingers or other objects within the near-field detection capabilities of their touch sensors), and identify and track their locations. Examples of multi-touch panels are described in Applicant's co-pending U.S. application Ser. No. 10/842,862 entitled "Multipoint Touchscreen," filed on May 6, 2004 and published as U.S. Published application No. 2006/0097991 on May 11, 2006, the contents of which are incorporated by reference herein.

Proximity sensor panels are another type of input device that can include an array of proximity sensors capable of detecting hover events (the no-touch, close proximity hovering of fingers or other objects above a surface but outside the near-field detection capabilities of touch sensors) as well as touch events. Proximity sensor panels may also be able to detect multiple instances of hovering referred to herein as multi-hover events (the hovering of fingers or other objects above a surface at distinct locations at about the same time). Examples of a proximity sensor, a proximity sensor panel, a multi-hover panel and a computing system using both a multi-touch panel and proximity sensors are described in Applicant's co-pending U.S. application Ser. No. 11/649,998 entitled "Proximity and Multi-Touch Sensor Detection and Demodulation," filed on Jan. 3, 2007, the contents of which are incorporated by reference herein.

Proximity sensor panels can be employed either alone or in combination with multi-touch panels. In addition, it is noted that some touch sensors, particularly capacitive touch sensors, can detect some hovering or proximity. Proximity sensors, as referred to herein, are understood to be distinct from touch sensors, including touch sensors that have some ability to detect proximity. Sensor panels capable of detecting multi-touch events or multi-hover events may be referred to herein as multi-event sensor panels.

Both touch sensor panels and proximity sensor panels can be an array of rows and columns of sensors. To scan a sensor panel, a stimulus can be applied to one row with all other rows held at DC voltage levels. When a row is stimulated, a modulated output signal can appear on the columns of the sensor panel. The columns can be connected to analog channels (also referred to herein as event detection and demodulation circuits). For every row that is stimulated, each analog channel connected to a column generates an output value representative of a change in the modulated output signal due to a touch or hover event occurring at the sensor located at the intersection of the stimulated row and the connected column. After analog channel output values are obtained for every column in the sensor panel, a new row is stimulated (with all other rows once again held at DC voltage levels), and additional analog channel output values are obtained. When all rows have been stimulated and analog channel output values have been obtained, the sensor panel is said to have been "scanned," and a complete "image" of touch or hover can be obtained over the entire sensor panel.

Each analog channel can include electronic components such as a virtual-ground charge amplifier, a signal mixer, offset compensation, a rectifier, a subtractor, and an analog-to-digital converter (ADC) that generates a digital signal representative of the change in the modulated output signal due to a touch or hover event. Ideally, with no stimulus applied to any row, the outputs of the analog channels connected to each column in the sensor panel will be the same, and will remain unchanged over temperature (representing a temperature coefficient of 1.0 for each analog channel). However, because electronic components are known to vary due to processing variations, manufacturing tolerances and assembly differences, and are known to vary over temperature, the analog channel output values can be different, and can change at different rates over temperature (i.e. the analog channels can have different temperature coefficients of something other than 1.0).

Assuming the existence of a temperature coefficient other than 1.0 for the analog channels, for the sake of uniformity it would at least be preferable to have the temperature coefficient for every analog channel be the same, so that the analog channel output values for every sensor or "pixel" on the sensor panel will track each other and an undistorted "image" of touch or hover can be obtained. For example, if a perfectly circular finger were to touch down at the exact center of a touch panel, it would be preferable for the resultant "image" of touch, as represented by the analog channel output values obtained during a single panel scan, to be a perfectly circular touch area at the center of the panel. However, because the temperature coefficient of each analog channel can vary by as much as a factor of five, the analog channel output values may not track each other and an inaccurate reading of the touch point can be obtained (i.e. the touch "image" can look distorted). In particular, it has been determined that the ADCs in the analog channels are more gain-stable than offset-stable, and that the center point of the ADCs drifts with temperature. Because the ADC output is essentially riding on a DC offset bias, and this DC offset drifts over temperature, the temperature coefficient of an analog channel has a larger effect on its static output value (the output value when a row is being stimulated and no finger or other object is present) than on its dynamic output value (the output value when a row is being stimulated and a finger or other object is present). If the ADC in each analog channel connected to each column in a sensor panel drifts at different rates, it distorts the "image" produced by the sensor panel.

SUMMARY OF THE INVENTION

In some configurations, the columns of a multi-touch panel or a multi-hover panel can be multiplexed to the analog channels that measure them in a greater than one-to-one relationship. That is, fewer analog channels can be employed to capture the signals sensed on the columns. However, in situations where it is desirable to scan an entire sensor panel quickly, a larger number of analog channels can be employed so that most or all of the columns of a sensor panel can be measured in parallel. When fewer (or even one) analog channels are replicated and used, compensation schemes may be unnecessary, because the thermal characteristics of the analog channels can be similar or identical. However, when a large number of analog channels are replicated, they may not all behave the same over temperature. Because the temperature coefficients of each analog channel can vary by as much as a factor of five, the analog channel output values may not track each other and an inaccurate reading of a touch or hover point can be obtained (i.e. the "image" can look distorted).

Embodiments of the present invention are directed to the calibration and normalization of the built-in DC offset error in each analog channel (event detection and demodulation circuit) to reduce or eliminate image distortion. In other words, by eliminating the component-dependent offset error from each analog channel, each analog channel will generate approximately the same output value for a given dynamic input signal. The compensation schemes described herein make all analog channels look like substantially similar copies of each other to minimize "image distortion" or skewing.

Normalization can include "phantom row" calibration or compensation, which involves measuring the static output value of each analog channel when no stimulus is applied to any row of a sensor panel (and therefore no dynamic input signal is being received by any analog channel), and subtracting this value out of any subsequent output value generated by the analog channel. Normalization can also include DAC offset compensation, which involves setting the offset compensation analog voltage (generated by a DAC) of each analog channel to some fraction of its normal value, measuring the output of the analog channel as a function of various DAC settings, determining a DAC output slope (i.e. the change of the analog output vs. DAC setting), comparing the value of the current DAC output slope to previously known DAC output slope values and adjusting any subsequent output value generated by the analog channel to account for drift in the DAC output slope.

As described above, to scan a sensor panel, an input stimulus can be applied, one row at a time, to each row in the sensor panel, with all other rows held at a DC voltage. In phantom row compensation, instead of applying a stimulus to a row and capturing the analog channel output values, during a calibration and normalization procedure, no stimulus is applied to any row of the sensor panel (and therefore no dynamic input signal is being received by any analog channel) while the analog channel output values are captured. This can be viewed as applying a stimulus to a "phantom" or nonexistent row and capturing the analog channel output values. Although a stimulus is not applied to any row of the sensor panel, a demodulation input is still applied to the demodulator of each analog channel. In addition, an analog offset compensation voltage of about zero volts is applied to the offset compensation of each analog channel. Under these conditions, the analog channel output values are then captured. The captured analog channel output values represent the offset errors intrinsic to the analog channel. These offset errors can then be subtracted out of any subsequent analog channel output value captured during a scan of a sensor panel.

In some embodiments of this invention, the offset errors can be captured as often as needed to adjust for temperature. In other words, in environments where the temperature rapidly changes, the computing system can cause the offset errors to be captured more frequently than in temperature-stable environments. In other embodiments, the offset errors can be captured on a periodic basis, such as once every 10 sensor panel scans. In still other embodiments, a plurality of offset error measurements can be captured and averaged. For example, to minimize the effect of time-based noise, a pre-determined number of offset error measurements can be captured and averaged, or the number of offset error measurements in a pre-determined amount of time can be captured and averaged.

Each analog channel includes offset compensation that can be provided by a DAC. However, if the offset compensating DAC itself drifts, it will feed some non-zero error value into the analog channel, and cause an offset error in the output of the analog channel. Therefore, in some embodiments of this invention, a DAC offset compensation procedure can be employed to compensate for offset errors due to drift in the DAC. As with phantom row compensation, DAC offset compensation requires that no input stimulus be applied to any row of a sensor panel (and thus no input signal is present at the input of any analog channel). The digital offset value can then be changed so that the DAC analog output is adjusted to some percentage (e.g. 50%) of its normal operation value. The analog voltage from the DAC will appear as an offset voltage at the output of the analog channel. This output can then be measured at two or more DAC settings, the change in the output over various DAC settings can be recorded and analyzed, and if the recorded analog outputs are substantially different than previously measured values a thermal drift for the DAC can be inferred. If a linear relationship is assumed, then if a certain change in the DAC setting causes the output to increase by a certain percentage (representative of the DAC thermal drift) with the fractional DAC analog voltage being applied, it can also be expected that the output will also increase by that same percentage when the normal operation DAC analog voltage is applied. Thus, the computed DAC thermal drift can be used to remove the effect of temperature changes on the analog channel output value.

DETAILED DESCRIPTION OF THE PREFERRED EMBODIMENT

In the following description of preferred embodiments, reference is made to the accompanying drawings which form a part hereof, and in which it is shown by way of illustration specific embodiments in which this invention can be practiced. It is to be understood that other embodiments can be used and structural changes can be made without departing from the scope of the preferred embodiments of the present invention.

Calibration and normalization of the built-in DC offset error in each analog channel (event detection and demodulation circuit) is disclosed. Normalization can include "phantom row" calibration or compensation, which involves measuring the static output value of each analog channel when no stimulus is applied to any row of a sensor panel (and therefore no dynamic input signal is being received by any analog channel), and subtracting this value out of any subsequent output value generated by the analog channel. Normalization can also include DAC offset compensation, which involves setting the offset compensation analog voltage of each analog channel to some fraction of its normal value, measuring the output of the analog channel over temperature, determining a temperature coefficient (i.e. the drift of the DAC over temperature), and adjusting any subsequent output value generated by the analog channel to account for this drift.

Although some embodiments of this invention may be described herein in terms of the normalization of analog channels coupled to touch sensor panels or proximity sensor panels, it should be understood that other embodiments of this invention may not be so limited, but can be generally applicable to analog channels that can be coupled to touch sensors or proximity sensors that are not part of a panel. Furthermore, although the touch sensors may be described herein as capacitive sensors, embodiments of this invention can be generally applicable to other types of touch sensors that can include resistive touch sensors, surface acoustic wave touch sensors, electromagnetic touch sensors, near field imaging touch sensors, and the like. In addition, although the proximity sensors may be described herein as infrared (IR) proximity sensors, embodiments of this invention may be generally applicable to other types of proximity sensors having an output that can be AC-coupled to an analog channel.

Figure 1:
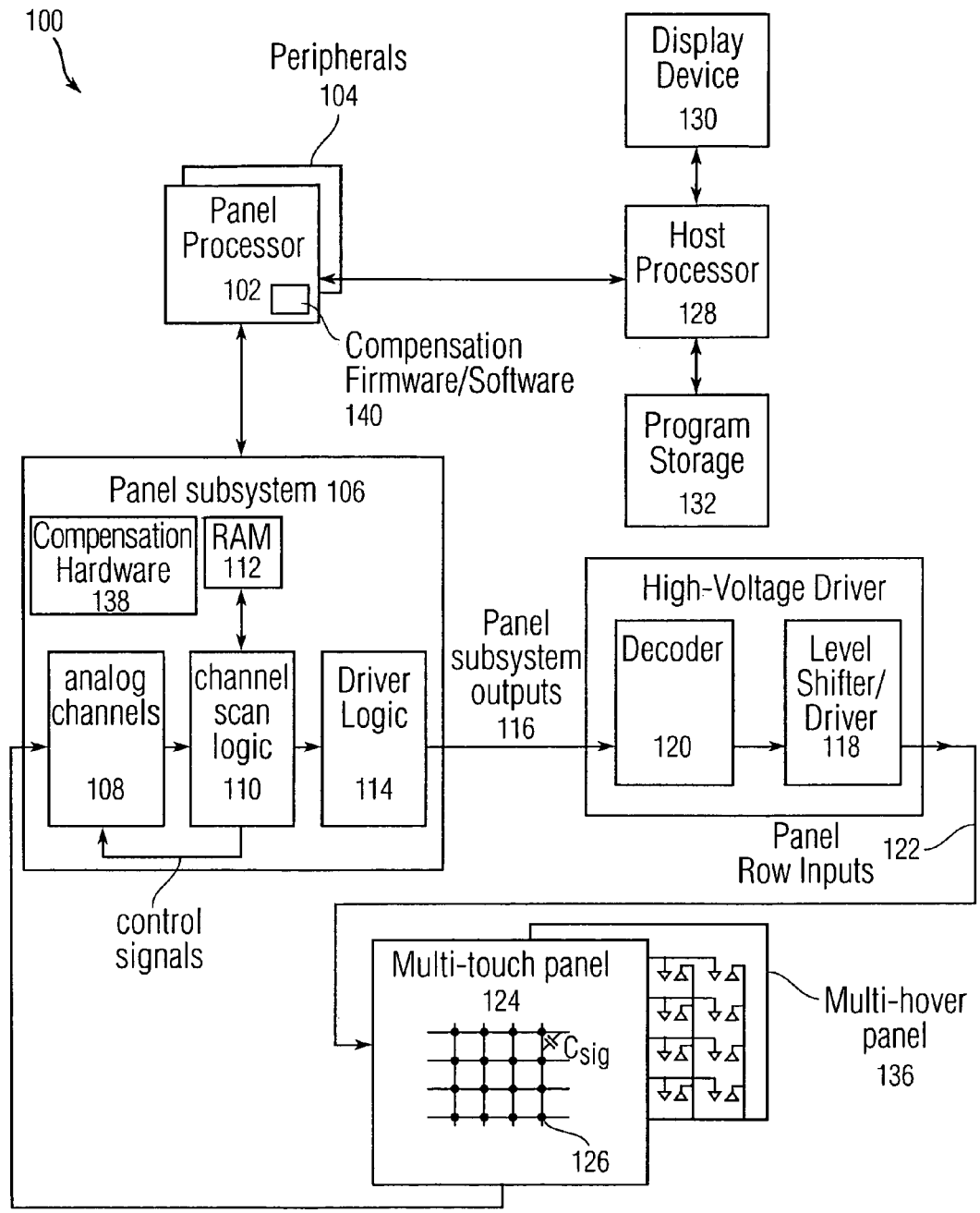
FIG. 1 illustrates an exemplary computing system that is capable of using either a multi-touch panel, a multi-hover panel, or a combination of both, and implementing one embodiment of this invention.

Multi-touch touch-sensitive panels according to one embodiment of this invention can detect multiple touches (touch events or contact points) that occur at about the same time (and at different times), and identify and track their locations. Similarly, multi-hover hover-sensitive panels can detect multiple occurrences of hovering (hover events) that occur at about the same time, and identify and track their locations. FIG. 1 illustrates exemplary computing system 100 that may be capable of using either multi-touch panel 124, multi-hover panel 136, or a combination of both. Computing system 100 can include one or more panel processors 102 and peripherals 104, and panel subsystem 106. One or more processors 102 can include, for example, ARM968 processors or other processors with similar functionality and capabilities. However, in other embodiments, the panel processor functionality can be implemented instead by dedicated logic, such as a state machine. Peripherals 104 can include, but are not limited to, random access memory (RAM) or other types of memory or storage, watchdog timers and the like.

Panel subsystem 106 can include, but is not limited to, one or more analog channels 108, channel scan logic 110 and driver logic 114. Channel scan logic 110 can access RAM 112, autonomously read data from the analog channels and provide control for the analog channels. This control can include multiplexing columns of multi-touch panel 124 or multi-hover panel 136 to analog channels 108. In addition, channel scan logic 110 can control the driver logic and stimulation signals being selectively applied to rows of multi-touch panel 124 or multi-hover panel 136. Hardware 138 in the panel subsystem 106, firmware 140 executed by the panel processor 102 and/or channel scan logic 110 (which may be referred to collectively herein as simply channel scan logic) can be used to perform the phantom row compensation and/or DAC offset compensation according to embodiments of this invention. In some embodiments, panel subsystem 106, panel processor 102 and peripherals 104 may be integrated into a single application specific integrated circuit (ASIC).

Driver logic 114 can provide multiple multi-touch subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and multi-touch panel 124 or multi-hover panel 136. Each multi-touch panel row input 122 can drive one or more rows in multi-touch panel 124 or multi-hover panel 136. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Computing system 100 can also include host processor 128 for receiving outputs from panel processor 102 and performing actions based on the outputs that may include, but are not limited to, moving an object such as a cursor or pointer, scrolling or panning, adjusting control settings, opening a file or document, viewing a menu, making a selection, executing instructions, operating a peripheral device connected to the host device, answering a telephone pall, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as a liquid crystal display (LCD) for providing a user interface (UI) to a user of the device.

Multi-touch panel 124 can in some embodiments include a capacitive sensing medium having a plurality of row traces or driving lines and a plurality of column traces or sensing lines, although other sensing media may also be used. The row and column traces can be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials, such as mylar. An additional dielectric cover layer may be placed over the row or column traces to strengthen the structure and protect the entire assembly from damage.

At the "intersections" of the traces, where the traces pass above and below each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after panel subsystem 106 has determined whether a touch event has been detected at each touch sensor in multi-touch panel 124, the pattern of touch sensors in the multi-touch panel at which a touch event occurred can be viewed as an "image" of touch (e.g. a pattern of fingers touching the panel).) When the two electrodes are at different potentials, each pixel can have an inherent self or mutual capacitance formed between the row and column electrodes of the pixel. If an AC signal is applied to one of the electrodes, such as by exciting the row electrode with an AC voltage at a particular frequency, an electric field and an AC or signal capacitance can be formed between the electrodes, referred to as Csig. The presence of a finger or other object near or on multi-touch panel 124 can be detected by measuring changes to Csig. The columns of multi-touch panel 124 can drive one or more analog channels 108 in panel subsystem 106. In some embodiments, each column is coupled to one dedicated analog channel 108. However, in other embodiments, the columns can be couplable via an analog switch to a fewer number of analog channels 108.

Figure 2A:
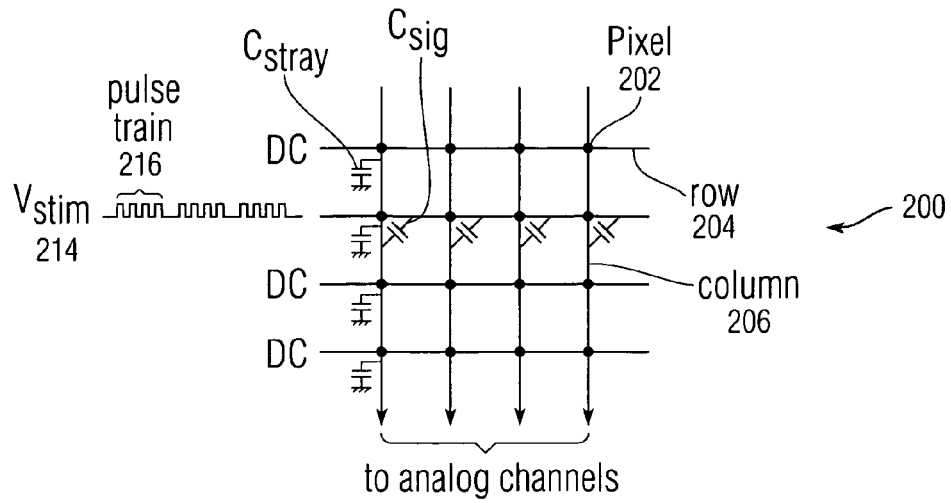
FIG. 2a illustrates an exemplary capacitive multi-touch panel according to one embodiment of this invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 may be selectively connectable to one or more analog channels (see analog channels 108 in FIG. 1).

Figure 2B:
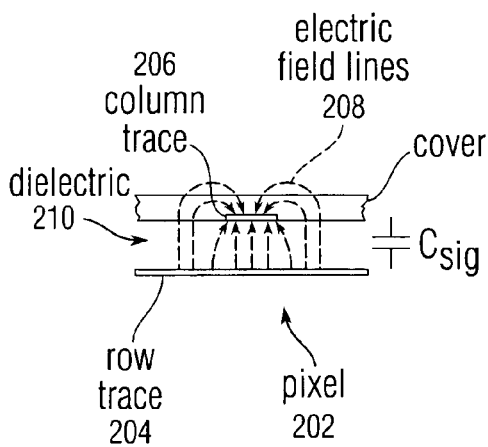
FIG. 2b is a side view of an exemplary capacitive touch sensor or pixel in a steady-state (no-touch) condition according to one embodiment of this invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 is shown.

Figure 2C:
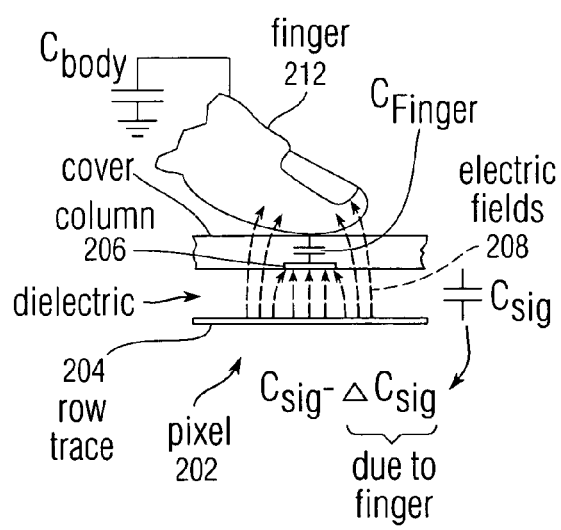
FIG. 2c is a side view of the exemplary capacitive touch sensor or pixel in a dynamic (touch) condition according to one embodiment of this invention.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 204 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig-ΔCsig, where Csig represents the static (no touch) component and ΔCsig represents the dynamic (touch) component. Note that Csig-ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including of a number of pulses. Although pulse trains 216 are shown as square waves, other waveshapes such as sine waves can also be employed. A plurality of pulse trains 216 at different frequencies can be transmitted for noise reduction purposes to detect and avoid noisy frequencies. Vstim signal 214 essentially injects a charge into the row, and can be applied to one row of multi-touch panel 200 at a time while all other rows are held at a DC level. However, in other embodiments, the multi-touch panel may be divided into two or more sections, with Vstim signal 214 being simultaneously applied to one row in each section and all other rows in that region section held at a DC voltage.

Each analog channel coupled to a column measures the mutual capacitance formed between that column and the row. This mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3:
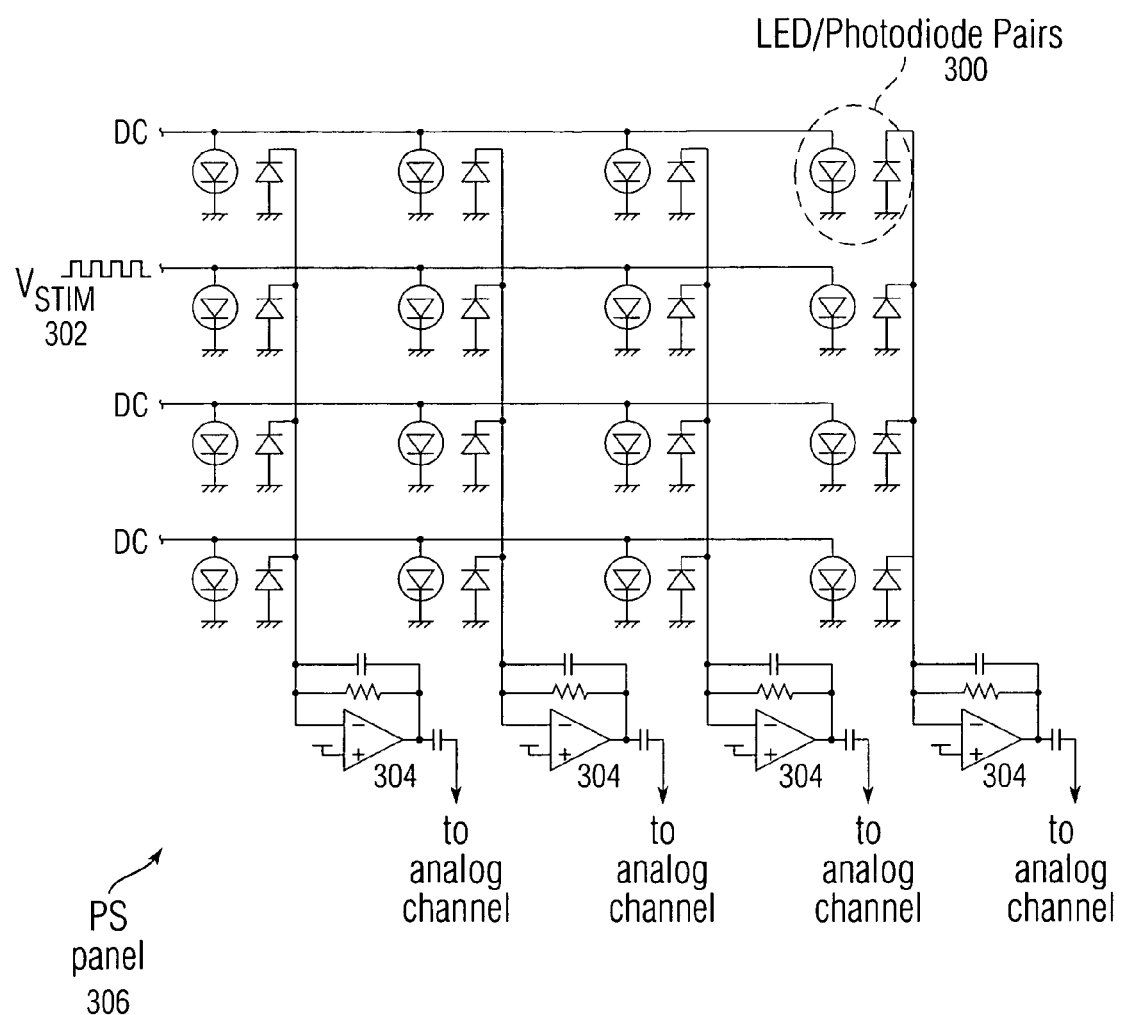
FIG. 3 illustrates an exemplary multi-hover panel formed as an array of light emitting diode (LED)/photodiode pairs, each pair representing a proximity sensor according to one embodiment of this invention.

FIG. 3 illustrates an exemplary proximity sensor panel 306 that can include an array of LED/photodiode pairs 300, each pair representing a portion of a proximity sensor, according to some embodiments of this invention. In FIG. 3, each LED/photodiode pair 300 in a particular row can be simultaneously stimulated by Vstim 302 with the other rows held at a DC voltage, and after a snapshot of the row has been captured, LED/photodiode pairs 300 in a new row can be stimulated. In the example of FIG. 3, each LED/photodiode pair 300 in a particular column can be simultaneously connected to a single photodiode amplifier 304, and each photodiode amplifier 304 can be connected to a separate analog channel of the same design that can be used to detect changes in signal capacitance in a capacitive touch sensor array. In this manner, for every row being stimulated, the analog channels for each column can determine, at about the same time, whether the LED/photodiode pair in the row being stimulated has detected the presence of a finger, palm or other object. Eventually, if Vstim has been applied to all rows, and the effect of any photodiode current on all columns in all rows has been captured (i.e. the entire proximity sensor panel 306 has been "scanned"), a "snapshot" of all pixel values may be obtained for the entire panel. This snapshot data may be initially saved in the panel subsystem, and later transferred out for interpretation by other devices in the computing system such as the host processor. As multiple snapshots are obtained, saved and interpreted by the computing system, it is possible for multiple hover events to be detected, tracked, and used to perform other functions.

Figure 4:
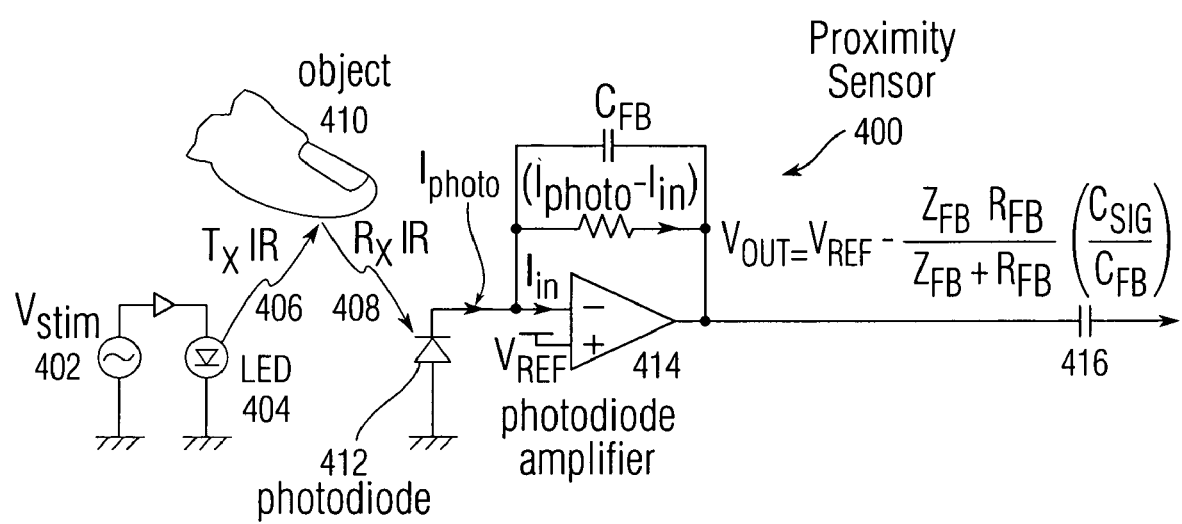
FIG. 4 is an illustration of an exemplary proximity sensor according to one embodiment of this invention.

FIG. 4 is an illustration of an exemplary proximity sensor 400 according to some embodiments of this invention. Proximity sensors 400 can detect one or more fingers, a palm or other object touching the multi-touch panel or hovering over the multi-touch panel in the far field without touching it. Proximity sensor 400 can include source Vstim 402 that drives IR light emitting diode (LED) 404, which emits transmitted IR 406. Vstim 402 can include a burst of square waves in an otherwise DC signal, in a manner similar to the Vstim applied to the rows on the capacitive multi-touch panel as described above, although in some embodiments the square waves representing Vstim can be preceded and followed by other non-DC signaling. Reflected IR 408, which may have reflected off of a finger, palm or other object 410, can be detected by a photodiode (e.g. a fast pin diode) 412 or any other device (e.g. a phototransistor or other sensing device) whose current changes as a function of received IR light. Photodiode 412 can be reversed biased to a reference voltage Vref, which can be maintained at the −input (inverting input) of photodiode amplifier 414 whose +input (non-inverting input) is tied to Vref. The photocurrent produced through the photodiode, Iphoto, also primarily passes through the parallel combination of feedback resistor Rfb and capacitor Cfb, and the output of the photodiode amplifier is Vref−(Zcfb×Rfb)× (Iphoto+Iin)/(Zcfb+Rfb), the latter term (Zcfb×Rfb)×(Iphoto+Iin)/(Zcfb+Rfb), representing the voltage drop across Rfb and Cfb where Iin is the input current to the inverting input of photodiode amplifier 414 and is usually negligible. The impedance Zcfb is frequency dependent and can be adjusted to optimize the gain of the photo amplifier for a given modulation frequency of the signal Iphoto, whereas Iphoto(t) =Ip×sin(wt) with wt=2×PI×fmod and fmod is the modulation signal, Ip is the amplitude of the modulation signal and Zcfb=−1/jwt). The modulation frequency fmod is equivalent to the modulation frequency fstm of Vstim. The output of photodiode amplifier 414 can be AC coupled using AC coupling capacitor 416.

Figure 5:
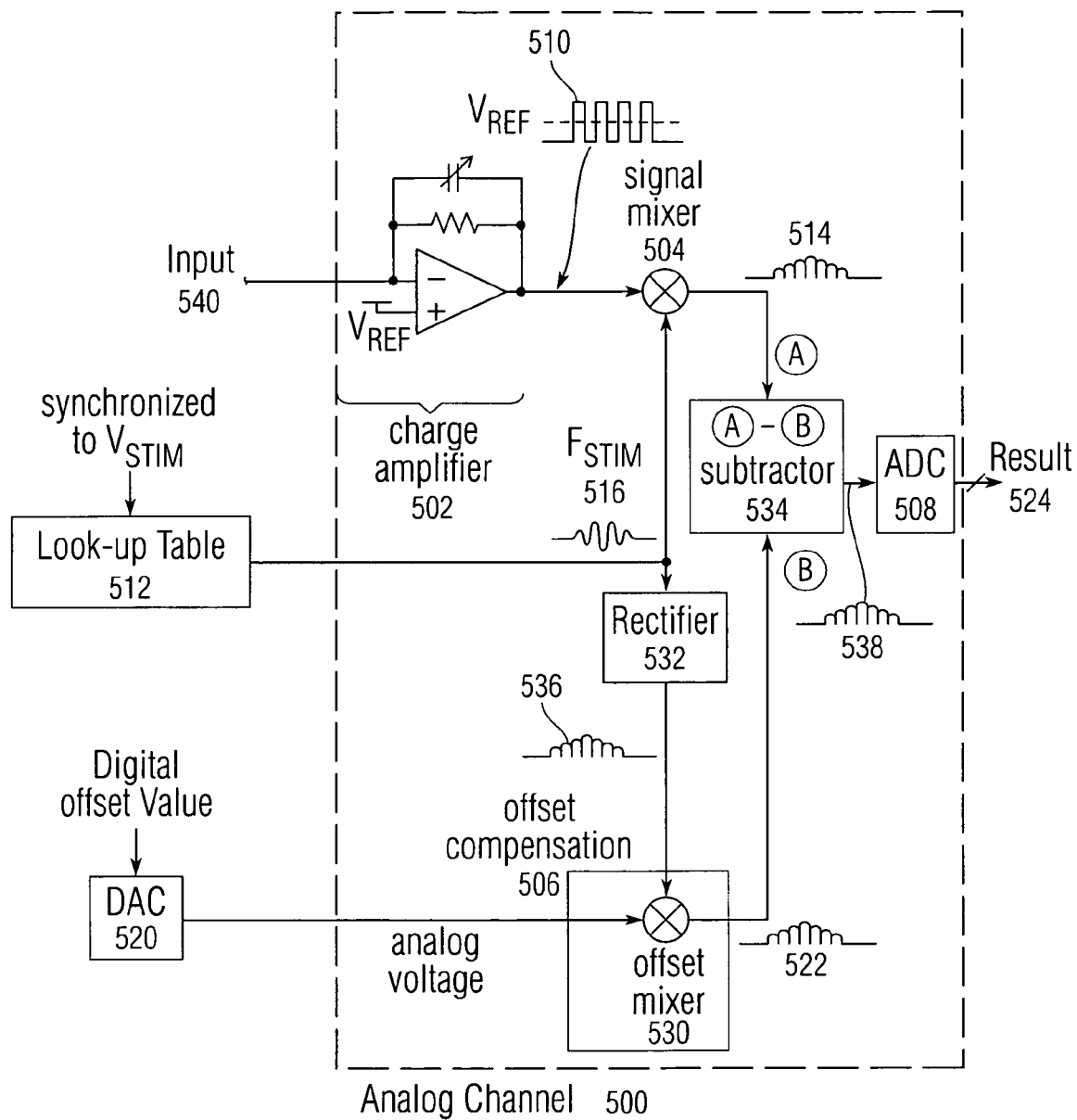
FIG. 5 illustrates an exemplary analog channel (event detection and demodulation circuit) according to one embodiment of this invention.

FIG. 5 illustrates an exemplary analog channel (event detection and demodulation circuit) 500. One or more analog channels 500 may be present in the panel subsystem. One or more columns from a multi-touch panel or a multi-hover panel may be connectable to input 540 of each analog channel 500. Each analog channel 500 can include virtual-ground charge amplifier 502, signal mixer 504, offset compensation 506, rectifier 532, subtractor 534, and analog-to-digital converter (ADC) 508.

Vstim, as applied to a row in the multi-touch panel or multi-hover panel, can be generated as a burst of square waves or other non-DC signaling in an otherwise DC signal, although in some embodiments the square waves representing Vstim can be preceded and followed by other non-DC signaling. If Vstim is applied to a row of a multi-touch panel or multi-hover panel, and a column of the multi-touch panel or multi-hover panel is connected to analog channel 500, the output of charge amplifier 502 can be pulse train 510 centered at Vref with a peak-to-peak (p-p) amplitude in the steady-state condition that is a fraction of the p-p amplitude of Vstim, the fraction corresponding to the gain of charge amplifier 502. For example, if Vstim includes 18V p-p pulses and the gain of the charge amplifier is 0.1, then the output of the charge amplifier may be 1.8V p-p pulses. This output can be mixed in signal mixer 504 with a demodulation waveform Fstim 516.

Because Vstim can create undesirable harmonics, especially if formed from square waves, demodulation waveform Fstim 516 can be a Gaussian sine wave in an otherwise DC signal that is digitally generated from a look-up table (LUT) 512 or other digital logic and synchronized to Vstim. In some embodiments, Fstim 516 can be tunable in frequency and amplitude by selecting different digital waveforms in LUT 512 or generating the waveforms differently using other digital logic. Signal mixer 504 can demodulate the output of charge amplifier 510 by subtracting Fstim 516 from the output to provide better noise rejection. Signal mixer 504 can reject all frequencies outside the passband, which can in one example be about +/−30 kHz around Fstim. This noise rejection can be beneficial in noisy environment with many sources of noise, such as 802.11, Bluetooth and the like, all having some characteristic frequency that can interfere with the sensitive (femtofarad level) analog channel 500. Signal mixer 504 can also be implemented as a synchronous rectifier, and as a result, signal mixer output 514 can be a rectified Gaussian sine wave.

Offset compensation 506 can then be applied to signal mixer output 514, which can remove the effect of the static Csig, leaving only the effect of ΔCsig appearing as a result 524. Offset compensation 506 may be implemented using offset mixer 530. Offset compensation output 522 can be generated by rectifying Fstim 516 using rectifier 532, and mixing rectifier output 536 with an analog voltage from digital-to-analog converter (DAC) 520 in offset mixer 530. DAC 520 can generate the analog voltage based on a digital value selected to increase the dynamic range of analog channel 500. Offset compensation output 522, which can be proportional to the analog voltage from DAC 520, can then be subtracted from signal mixer output 514 using subtractor 534, producing subtractor output 538 which can be representative of the change in the AC capacitance ΔCsig that occurs when a capacitive sensor on the row being stimulated has been touched or a hover event has occurred. Subtractor output 538 is then integrated and can then be converted to a digital value by ADC 508. In some embodiments, integrator and ADC functions are combined and ADC 508 an integrating ADC, such as a sigma-delta ADC, which can sum a number of consecutive digital values and average them to generate result 524.

As mentioned above, in some embodiments the columns of a multi-touch panel or a multi-hover panel can be multiplexed to the analog channels in a greater than one-to-one relationship. That is, fewer analog channels can be employed to capture the signals sensed on the columns. However, in embodiments where it is desirable to scan an entire sensor panel quickly, a larger number of analog channels can be employed so that most or all of the columns of a sensor panel can be measured in parallel. When fewer (or even one) analog channels are replicated and used, compensation schemes may be unnecessary, because the thermal characteristics of the analog channels may be similar or identical. However, when a large number of analog channels are replicated, they may not all behave the same over temperature. Because the temperature coefficients of each analog channel can vary by as much as a factor of five, the analog channel output values may not track each other and an inaccurate reading of a touch or hover point can be obtained (i.e. the "image" can look distorted).

Embodiments of the present invention calibrate and normalize the built-in DC offset error in each analog channel 500 so that each analog channel generates a uniform representation of the dynamic (touch or hover-induced) input signal received by the analog channel. In other words, by eliminating the component-dependent static DC offset error from each analog channel 500, each analog channel will generate approximately the same output value 524 for a given dynamic input signal. The compensation schemes described herein make all analog channels look like substantially similar copies of each other to minimize "image distortion" or skewing.

To accomplish this, embodiments of this invention use the concept of a "phantom" row. As described above, to scan a sensor panel, an input stimulus can be applied, one row at a time, to each row in the sensor panel, with all other rows held at a DC voltage. In embodiments of this invention, instead of applying a stimulus to a row and capturing the analog channel output values, during a calibration and normalization procedure, no stimulus is applied to any row of the sensor panel (and therefore no dynamic input signal is being received by any analog channel) while the analog channel output values are captured. This can be viewed as applying a stimulus to a "phantom" or nonexistent row and capturing the analog channel output values.

Figure 6A:
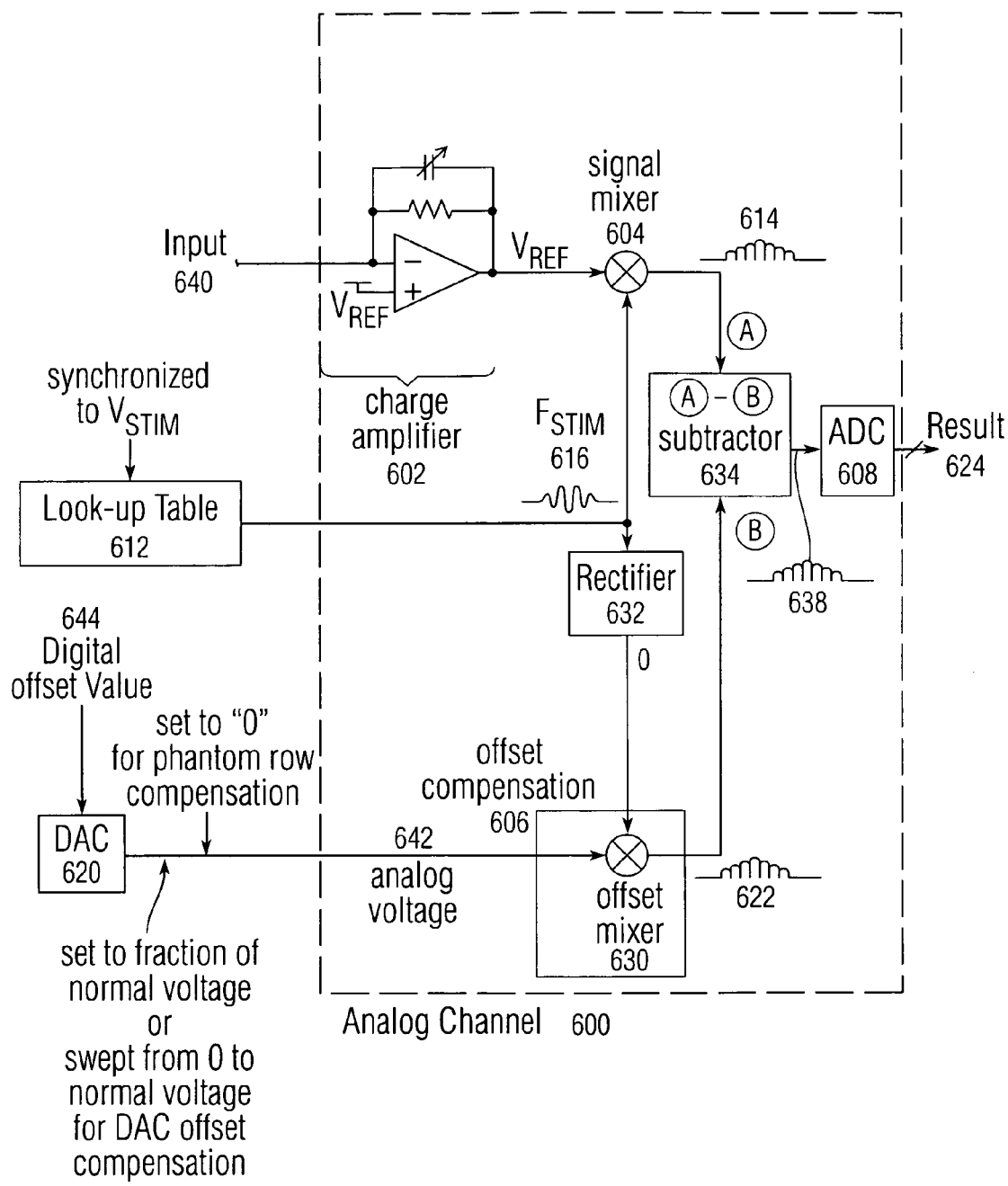
FIG. 6a illustrates an exemplary analog channel configured for performing phantom row compensation and/or digital-to-analog converter (DAC) offset compensation according to one embodiment of this invention.
Figure 6B:
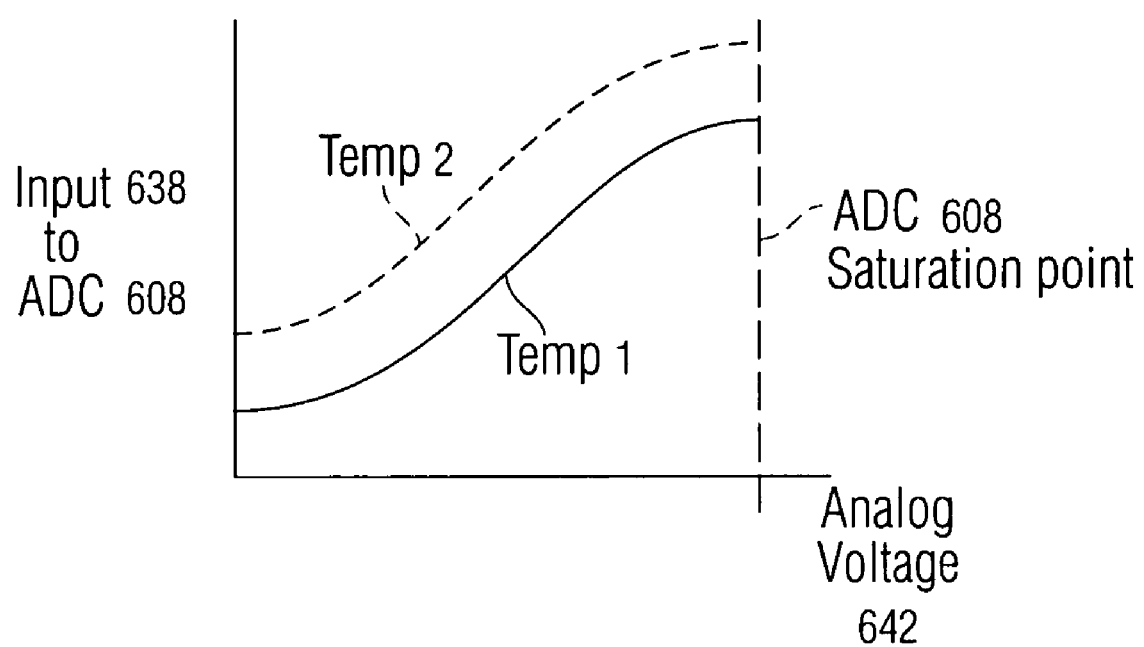
FIG. 6b illustrates an exemplary plot of analog offset voltage versus input voltage to the ADC for two temperatures generated during DAC offset compensation according to one embodiment of this invention.

FIG. 6a illustrates an exemplary analog channel during the above-described phantom row calibration or compensation procedure according to embodiments of this invention. During this calibration and normalization procedure, no stimulus is applied to any row of a sensor panel, and therefore no input signal is being received at input 640 of any analog channel. In other words, charge amplifier input 640 is left floating. With no input signal 640 present, the output of charge amplifier 602 is held at Vref. Although Vstim is not applied to any row of the sensor panel, the demodulation input Fstim 616, which is generated from LUT 612, is still applied to signal mixer 604 of each analog channel 600 during phantom row measurements. However, the demodulation input is not applied to offset mixer 630 via rectifier 632. In addition, analog offset compensation voltage 642 from DAC 620 of about zero volts is applied to the offset compensation block 606, because there is no need to apply an offset when there is no stimulus being applied. Under these conditions, analog channel output values 624 are then captured. The captured analog channel output values 624 represent the offset errors intrinsic to the electronics and center drift of ADC 608, and provide a reference or zero point for the ADC. Because the analog channel offset errors can be captured in parallel, the measurement of these values can be captured quickly within the panel subsystem, as fast as the capturing of analog channel output values when a row is being stimulated. These offset errors can then be subtracted out of any subsequent analog channel output value captured during a scan of a sensor panel.

In some embodiments of this invention, the offset errors can be captured as often as needed to adjust for temperature. In other words, in environments where the temperature rapidly changes, the computing system can cause the offset errors to be captured more frequently than in temperature-stable environments. In other embodiments, the offset errors can be captured on a periodic basis, such as once every 10 sensor panel scans. In still other embodiments, a plurality of offset error measurements can be captured and averaged. For example, to minimize the effect of time-based noise, a pre-determined number of offset error measurements can be captured and averaged, or the number of offset error measurements in a pre-determined amount of time can be captured and averaged.

As mentioned above, during a normal sensor panel scan, a digitally generated Gaussian-shaped sinewave is generated from LUT 612 and rectified in rectifier 632 before it is fed into offset mixer 630 at a relatively large signal level, where it is mixed with an analog voltage from DAC 620. However, if offset compensating DAC 620 itself drifts, it will feed some non-zero error value into offset mixer 630, and cause an offset error in ADC output 624.

Therefore, in some embodiments of this invention, a DAC offset compensation procedure can be employed to compensate for offset errors due to drift in DAC 620. FIG. 6a further illustrates how DAC offset compensation can be applied to an exemplary analog channel according to embodiments of this invention. As with phantom row compensation, DAC offset compensation requires that no input stimulus be applied to any row of a sensor panel (and thus no input signal is present at the input 640 of any analog channel). Digital offset value 644 can then be changed so that DAC analog output 642 is adjusted to some percentage (e.g. 50%) of its normal operation value (based on the gain setting of ADC 608) to ensure that the ADC does not get saturated. Analog voltage 642 from DAC 620 will appear as an offset voltage at output 622 of offset mixer 630, and output 638 of subtractor 634 (and result 624 from ADC 608) will include this offset voltage. Either analog output 638 or digital result 624 can be captured at this particular setting of DAC analog output 642. Digital offset value 644 can then be changed to another value so that DAC analog output 642 is adjusted to some different percentage of its normal value, and output 638 or result 624 can be captured at this new setting. Additional data points can also be obtained in the same manner. After two or more data points have been captured, an initial DAC output slope can be computed which represents the change in the analog channel output vs. DAC setting. If a linear relationship is assumed, this initial DAC output slope can be used to predict the initial value of output 638 or result 624 if the normal operation value of DAC analog output 642 was used instead of a fractional value.

At a later time, additional sets of data points can be obtained using fractional DAC analog output values as described above, and a current DAC output slope can be computed. This current DAC output slope can be used to predict the current value of output 638 or result 624 if the normal operation value of DAC analog output 642 was used instead of a fractional value. If the current value of output 638 or result 624 is substantially different from the previously computed initial value, then a thermal drift for DAC 620 can be inferred, and this difference (a thermal drift value) can be subtracted from subsequent normal operation values of output 638 or result 624.

At an even later time, yet another DAC output slope value can be obtained and a new predicted value of output 638 or result 624 can be computed. Once again, if the new predicted value of output 638 or result 624 is substantially different from the previously computed initial value, then a thermal drift for DAC 620 can be inferred, and this difference can be subtracted from subsequent normal operation values of output 638 or result 624.

In some embodiments of this invention, DAC offset compensation as described above can be performed as often as needed to adjust for temperature. In other words, in environments where the temperature rapidly changes, the computing system can cause predicted normal operation values to be computed more frequently than in temperature-stable environments, so that more frequent adjustments can be made. In other embodiments, DAC offset compensation can be performed on a periodic basis, such as once every 10 sensor panel scans. In still other embodiments, a plurality of predicted normal operation values can be captured and averaged. For example, to minimize the effect of time-based noise, a predetermined number of predicted normal operation values can be captured and averaged, or the number of predicted normal operation values in a pre-determined amount of time can be captured and averaged, and then compared to the initial predicted normal operation value before adjustments, if any, are made.

In other embodiments, rather than assuming linearity and computing a predicted normal operation value based on a couple of data points, DAC offset compensation can be performed more accurately by sweeping analog voltage 642 from DAC 620 from zero on up until ADC 608 saturates, resulting in a Temp 1 curve as shown in FIG. 7. Note that Temp 1 does not need to be known. The Temp 1 curve, which may be nonlinear, can be extrapolated to predict an initial normal operation value for output 638 or result 624. At a later time, analog voltage 642 from DAC 620 can be swept again from zero on up until ADC 608 saturates to get the Temp 2 curve. Note that Temp 2 does not need to be known. The Temp 2 curve, which may be nonlinear, can be extrapolated to predict a current normal operation value for output 638 or result 624. If there is a difference between the initial and current predicted normal operation values, thermal drift can be inferred, and this difference can be subtracted from subsequent normal operation values.

Figure 7A:
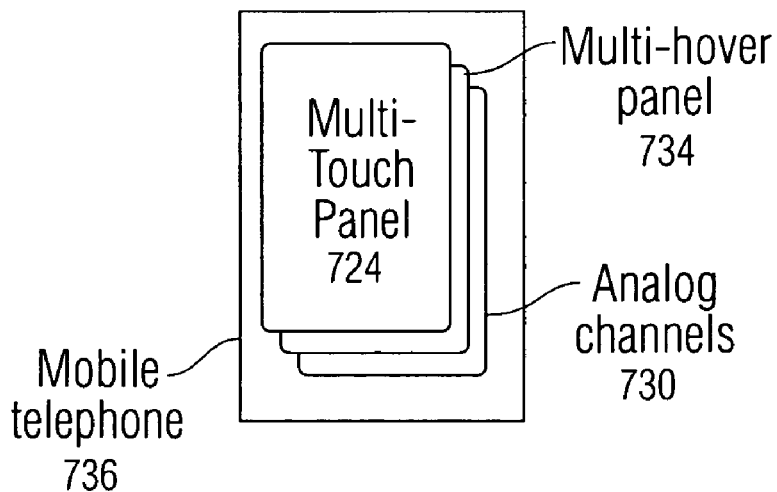
FIG. 7a illustrates an exemplary mobile telephone that can include a multi-touch panel, multi-hover panel, and analog channels capable of implementing phantom row compensation and/or DAC offset compensation according to one embodiment of this invention.
Figure 7B:
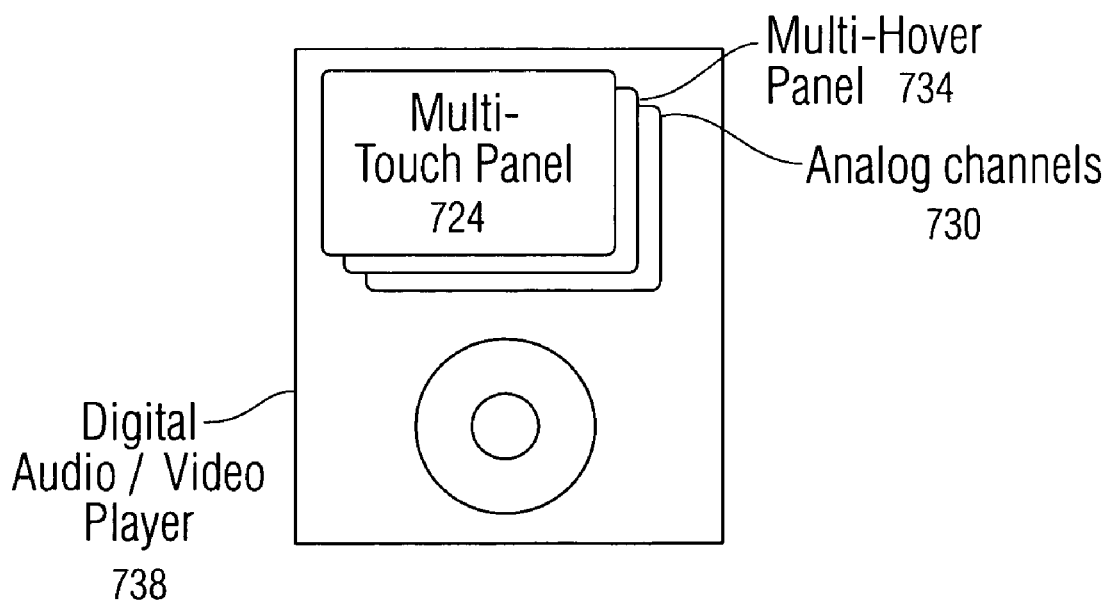
FIG. 7b illustrates an exemplary digital audio/video player that can include a multi-touch panel, multi-hover panel, and analog channels capable of implementing phantom row compensation and/or DAC offset compensation according to one embodiment of this invention.

FIG. 7a illustrates an exemplary mobile telephone 736 that can include multi-touch panel 724 and/or multi-hover panel 734 and analog channels 730 configured for implementing phantom row compensation and/or DAC offset compensation as described above according to embodiments of this invention. FIG. 7b illustrates an exemplary digital audio/video player 738 that can include multi-touch panel 724 and/or multi-hover panel 734 and analog channels 730 configured for implementing phantom row compensation and/or DAC offset compensation as described above according to embodiments of this invention. The mobile telephone and digital audio/video player of FIGS. 7a and 7b can advantageously benefit from phantom row compensation and/or DAC offset compensation because without it, component variations and/or temperature variations can cause distorted images of touch and/or hover on a touch or proximity sensor panel to be generated, which can cause these devices to erroneously interpret a particular touch or hover event as triggering an incorrect function.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for normalizing DC offset error in an event detection and demodulation circuit configured for generating a value representative of a change in a signal sensed on a column of a multi-event sensor panel, the event detection and demodulation circuit having a charge amplifier, a demodulator and offset compensation, the method comprising:
   floating a charge amplifier input of the charge amplifier;
   applying a burst demodulation signal to a demodulation input of the demodulator;
   applying a first voltage to an analog offset compensation input of the offset compensation;
   measuring an output value of the event detection and demodulation circuit to obtain the DC offset error; and
   subtracting the DC offset error from subsequent measured output values of the event detection and demodulation circuit when an input stimulus is applied to a row in the multi-event sensor panel.

2. The method of claim 1, the multi-event sensor panel comprising a multi-touch sensor panel.

3. The method of claim 1, the multi-event sensor panel comprising a multi-hover sensor panel.

4. The method of claim 1, further comprising applying the first voltage at about zero volts to the analog offset compensation input to obtain the DC offset error.

5. The method of claim 1, further comprising obtaining a predetermined number of DC offset error measurements and averaging them before subtracting an averaged DC offset error from subsequent measured output values of the event detection and demodulation circuit when an input stimulus is applied to a row in the multi-event sensor panel.

6. An apparatus for normalizing DC offset error in an event detection and demodulation circuit configured for generating a value representative of a change in a signal sensed on a column of a multi-event sensor panel, the event detection and demodulation circuit having a charge amplifier, a demodulator and offset compensation, the apparatus comprising:

driver logic configured for floating a charge amplifier input of the charge amplifier; and channel scan logic configured for applying a burst demodulation signal to a demodulation input of the demodulator, applying a first voltage to an analog offset compensation input of the offset compensation, measuring an output value of the event detection and demodulation circuit to obtain the DC offset error, and subtracting the DC offset error from subsequent measured output values of the event detection and demodulation circuit when an input stimulus is applied to a row in the multi-event sensor panel.

7. The apparatus of claim 6, the multi-event sensor panel comprising a multi-touch sensor panel.

8. The apparatus of claim 6, the multi-event sensor panel comprising a multi-hover sensor panel.

9. The apparatus of claim 6, the driver logic further configured for applying the first voltage at about zero volts to the analog offset compensation input to obtain the DC offset error.

10. The apparatus of claim 6, the channel scan logic further configured for obtaining a predetermined number of DC offset error measurements and averaging them before subtracting an averaged DC offset error from subsequent measured output values of the event detection and demodulation circuit when an input stimulus is applied to a row in the multi-event sensor panel.

11. The apparatus of claim 6:

the driver logic further configured for applying the first voltage at a first predetermined percentage of an operational voltage, the operational voltage representing a voltage that is applied to the analog offset compensation input when an input stimulus is applied to a row in the multi-event sensor panel, applying a second voltage at a second predetermined percentage of the operational voltage, and at a later time, applying a third voltage at a third predetermined percentage of the operational voltage, and applying a fourth voltage at a fourth predetermined percentage of the operational voltage; and the channel scan logic further configured for computing a first digital-to-analog converter (DAC) output slope from the first voltage, the first output value, the second voltage, and the second output value, and computing a predicted initial normal operation value, computing a second DAC output slope from the third voltage, the third output value, the fourth voltage, and the fourth output value, and computing a predicted current normal operation value, determining a thermal drift value for the event detection and demodulation circuit as the difference between the current normal operation value and the initial normal operation value, the thermal drift value representing a DAC error in the event detection and demodulation circuit over temperature, and subtracting the thermal drift value from subsequent measured output values of the event detection and demodulation circuit obtained when an input stimulus is applied to a row in the multi-event sensor panel and the operational voltage is applied to the analog offset compensation input to account for the DAC error.

12. An apparatus for normalizing output values obtained from a plurality of event detection and demodulation circuits, each event detection and demodulation circuit connected to a different column of a multi-event sensor panel, comprising:

driver logic configured for applying no input stimulus to any row of the multi-event sensor panel; and channel scan logic configured for measuring the output value of each event detection and demodulation circuit to obtain a DC offset error for each event detection and demodulation circuit, and for each event detection and demodulation circuit, subtracting the DC offset error obtained for that event detection and demodulation circuit from subsequent measured output values of the event detection and demodulation circuit obtained when an input stimulus is applied to a row in the multi-event sensor panel.

13. The apparatus of claim 12, each event detection and demodulation circuit having a charge amplifier, a demodulator and offset compensation:

the driver logic further configured for floating a charge amplifier input of the charge amplifier in each event detection and demodulation circuit in the multi-event sensor panel; and the channel scan logic further configured for applying a burst demodulation signal to a demodulation input of the demodulator of each event detection and demodulation circuit, and applying a first voltage to an analog offset compensation input of the offset compensation of each event detection and demodulation circuit, prior to measuring the output value of each event detection and demodulation circuit to obtain a DC offset error for each event detection and demodulation circuit.

14. The apparatus of claim 12, the multi-event sensor panel comprising a multi-touch sensor panel.

15. The apparatus of claim 12, the multi-event sensor panel comprising a multi-hover sensor panel.

16. The apparatus of claim 13, the driver logic further configured for applying the first voltage at about zero volts to the analog offset compensation input of each event detection and demodulation circuit to obtain the DC offset error for each event detection and demodulation circuit.

17. The apparatus of claim 12, the channel scan logic further configured for obtaining a predetermined number of DC offset error measurements for each event detection and demodulation circuit and averaging them before subtracting an averaged DC offset error from any subsequent measured output value of each event detection and demodulation circuit when an input stimulus is applied to a row in the multi-event sensor panel.

18. The apparatus of claim 12, further comprising a panel subsystem that incorporates the apparatus.

19. The apparatus of claim 18, further comprising a computing system that incorporates the panel subsystem, the computing system comprising:

a multi-event sensor panel coupled to the panel subsystem;

a panel processor coupled to the panel subsystem; and a host processor coupled to the panel processor.

20. The apparatus of claim 19, further comprising a mobile telephone that incorporates the computing system.

21. The apparatus of claim 19, further comprising a digital audio player that incorporates the computing system.

22. An apparatus for normalizing DC offset error in an event detection and demodulation circuit configured for generating a value representative of a change in a signal sensed on a column of a multi-event sensor panel, the event detection and demodulation circuit having a charge amplifier, a demodulator and offset compensation, the apparatus comprising:

means for floating a charge amplifier input of the charge amplifier; and means for applying a burst demodulation signal to a demodulation input of the demodulator, applying a first voltage to an analog offset compensation input of the offset compensation, measuring an output value of the event detection and demodulation circuit to obtain the DC offset error, and subtracting the DC offset error from subsequent measured output values of the event detection and demodulation circuit when an input stimulus is applied to a row in the multi-event sensor panel.

23. An apparatus for normalizing output values obtained from a plurality of event detection and demodulation circuits, each event detection and demodulation circuit connected to a different column of a multi-event sensor panel, comprising:

means for applying no input stimulus to any row of the multi-event sensor panel; and means for measuring the output value of each event detection and demodulation circuit to obtain a DC offset error for each event detection and demodulation circuit, and for each event detection and demodulation circuit, subtracting the DC offset error obtained for that event detection and demodulation circuit from subsequent measured output values of the event detection and demodulation circuit obtained when an input stimulus is applied to a row in the multi-event sensor panel.

24. A method for providing digital-to-analog converter (DAC) offset compensation in an event detection and demodulation circuit configured for generating a value representative of a change in a signal sensed on a column of a multi-event sensor panel, the event detection and demodulation circuit having a charge amplifier, a demodulator and offset compensation, the method comprising:

floating a charge amplifier input of the charge amplifier;

applying a burst demodulation signal to a demodulation input of the demodulator;

applying a first voltage to an analog offset compensation input of the offset compensation at a first predetermined percentage of an operational voltage, the operational voltage representing a voltage that is applied to the analog offset compensation input when an input stimulus is applied to a row in the multi-event sensor panel, measuring a first output value, applying a second voltage at a second predetermined percentage of the operational voltage and measuring a second output value;

computing a first digital-to-analog converter (DAC) output slope from the first voltage, the first output value, the second voltage, and the second output value, and computing a predicted initial normal operation value;

at a later time, applying a third voltage at a third predetermined percentage of the operational voltage and measuring a third output value, applying a fourth voltage at a fourth predetermined percentage of the operational voltage and measuring a fourth output value, and computing a second DAC output slope from the third voltage, the third output value, the fourth voltage, and the fourth output value, and computing a predicted current normal operation value;

determining a thermal drift value for the event detection and demodulation circuit as the difference between the current normal operation value and the initial normal operation value, the thermal drift value representing a DAC error in the event detection and demodulation circuit over temperature; and subtracting the thermal drift value from subsequent measured output values of the event detection and demodulation circuit obtained when an input stimulus is applied to a row in the multi-event sensor panel and the operational voltage is applied to the analog offset compensation input to account for the DAC error.

25. A method for providing digital-to-analog converter (DAC) offset compensation in an event detection and demodulation circuit configured for generating a value representative of a change in a signal sensed on a column of a multi-event sensor panel, the event detection and demodulation circuit having a charge amplifier, a demodulator and offset compensation, the method comprising:

floating a charge amplifier input of the charge amplifier;

applying a burst demodulation signal to a demodulation input of the demodulator;

applying the first voltage gradually from about zero volts to a first predetermined percentage of an operational voltage, the operational voltage representing a voltage that is applied to the analog offset compensation input when an input stimulus is applied to a row in the multi-event sensor panel, and measuring first output values of the event detection and demodulation circuit as the first voltage is gradually applied;

computing a predicted initial normal operation value from the first voltage and the first output values;

at a later time, applying a second voltage gradually from about zero volts to a second predetermined percentage of the operational voltage, measuring second output values of the event detection and demodulation circuit as the second voltage is gradually applied, computing a predicted current normal operation value from the second voltage and the second output values;

determining a thermal drift value for the event detection and demodulation circuit as the difference between the current normal operation value and the initial normal operation value, the thermal drift value representing a digital-to-analog converter (DAC) error in the event detection and demodulation circuit over temperature; and subtracting the thermal drift value from subsequent measured output values of the event detection and demodulation circuit obtained when an input stimulus is applied to a row in the multi-event sensor panel and the operational voltage is applied to the analog offset compensation input to account for the DAC error.

26. A mobile telephone including an apparatus for normalizing DC offset error in an event detection and demodulation circuit configured for generating a value representative of a change in a signal sensed on a column of a multi-event sensor panel, the event detection and demodulation circuit having a charge amplifier, a demodulator and offset compensation, the apparatus comprising:

driver logic configured for floating a charge amplifier input of the charge amplifier; and channel scan logic configured for applying a burst demodulation signal to a demodulation input of the demodulator, applying a first voltage to an analog offset compensation input of the offset compensation, measuring an output value of the event detection and demodulation circuit to obtain the DC offset error, and subtracting the DC offset error from subsequent measured output values of the event detection and demodulation circuit when an input stimulus is applied to a row in the multi-event sensor panel.

27. A digital audio player including an apparatus for normalizing DC offset error in an event detection and demodulation circuit configured for generating a value representative of a change in a signal sensed on a column of a multi-event sensor panel, the event detection and demodulation circuit having a charge amplifier, a demodulator and offset compensation, the apparatus comprising:

driver logic configured for floating a charge amplifier input of the charge amplifier; and channel scan logic configured for applying a burst demodulation signal to a demodulation input of the demodulator, applying a first voltage to an analog offset compensation input of the offset compensation, measuring an output value of the event detection and demodulation circuit to obtain the DC offset error, and subtracting the DC offset error from subsequent measured output values of the event detection and demodulation circuit when an input stimulus is applied to a row in the multi-event sensor panel.

* * * * *

UNITED STATES PATENT AND TRADEMARK OFFICE
CERTIFICATE OF CORRECTION

| | | |
|---|---|---|
| PATENT NO. | : 7,692,638 B2 | Page 1 of 1 |
| APPLICATION NO. | : 11/650204 | |
| DATED | : April 6, 2010 | |
| INVENTOR(S) | : Brian Richards Land et al. | |

It is certified that error appears in the above-identified patent and that said Letters Patent is hereby corrected as shown below:

In column 6, line 67, delete "pall," and insert -- call, --, therefor.

In column 8, line 3, delete "couplable" and insert -- coupled --, therefor.

In column 10, line 23, delete "Zcfb=-1/jwt)." and insert -- Zcfb=-1/(jwt). --, therefor.

Signed and Sealed this
Eighth Day of November, 2011

David J. Kappos
*Director of the United States Patent and Trademark Office*